United States Patent
Shirakawa

(10) Patent No.: US 8,970,763 B2
(45) Date of Patent: Mar. 3, 2015

(54) IMAGE PICKUP APPARATUS HAVING ELECTRONIC COMPASS FUNCTION, CONTROL METHOD THEREFOR, AND STORAGE MEDIUM

(75) Inventor: Yusuke Shirakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/597,850

(22) Filed: Aug. 29, 2012

(65) Prior Publication Data

US 2013/0076958 A1    Mar. 28, 2013

(30) Foreign Application Priority Data

Sep. 26, 2011   (JP) .................................. 2011-209003

(51) Int. Cl.
*H04N 5/222* (2006.01)
*G01C 17/00* (2006.01)
*H04N 5/225* (2006.01)
*H04N 5/232* (2006.01)

(52) U.S. Cl.
CPC .............. *G01C 17/00* (2013.01); *H04N 5/2259* (2013.01); *H04N 5/23245* (2013.01); *H04N 5/23293* (2013.01)
USPC .................................. 348/333.02; 348/222.1

(58) Field of Classification Search
CPC .... H04N 5/23293; H04N 5/772; H04N 5/232
USPC ................. 348/222.1, 333.01, 333.11, 333.02
See application file for complete search history.

(56) References Cited

U.S. PATENT DOCUMENTS

| 5,913,078 A * | 6/1999 | Kimura et al. ................... 396/50 |
| 2003/0231243 A1* | 12/2003 | Shibutani ................. 348/207.99 |
| 2009/0052729 A1* | 2/2009 | Bae ................................. 382/100 |
| 2011/0096319 A1* | 4/2011 | Otani et al. ................... 356/3.14 |
| 2012/0268621 A1* | 10/2012 | Kanma et al. ............... 348/222.1 |

FOREIGN PATENT DOCUMENTS

| JP | 11-155124 | 6/1999 |
| JP | 2008-017223 | 1/2008 |

* cited by examiner

*Primary Examiner* — Gevell Selby
(74) *Attorney, Agent, or Firm* — Cowan, Liebowitz & Latman, P.C.

(57) ABSTRACT

An image pickup apparatus which is capable of displaying a shooting azimuth for a user such that it can be intuitively understood with ease while keeping the amount of computations required to display a shooting azimuth small. When a though-the-lens image or a moving image from an image pickup sensor, which shoots a subject, is displayed on a TFT display, a shooting azimuth is displayed by a first azimuth display method based on shooting azimuth information, and when a though-the-lens image or a moving image from the image pickup sensor is not displayed on the TFT display, the shooting azimuth is displayed based on the shooting azimuth information by a second azimuth display method different from the first azimuth display method.

16 Claims, 6 Drawing Sheets

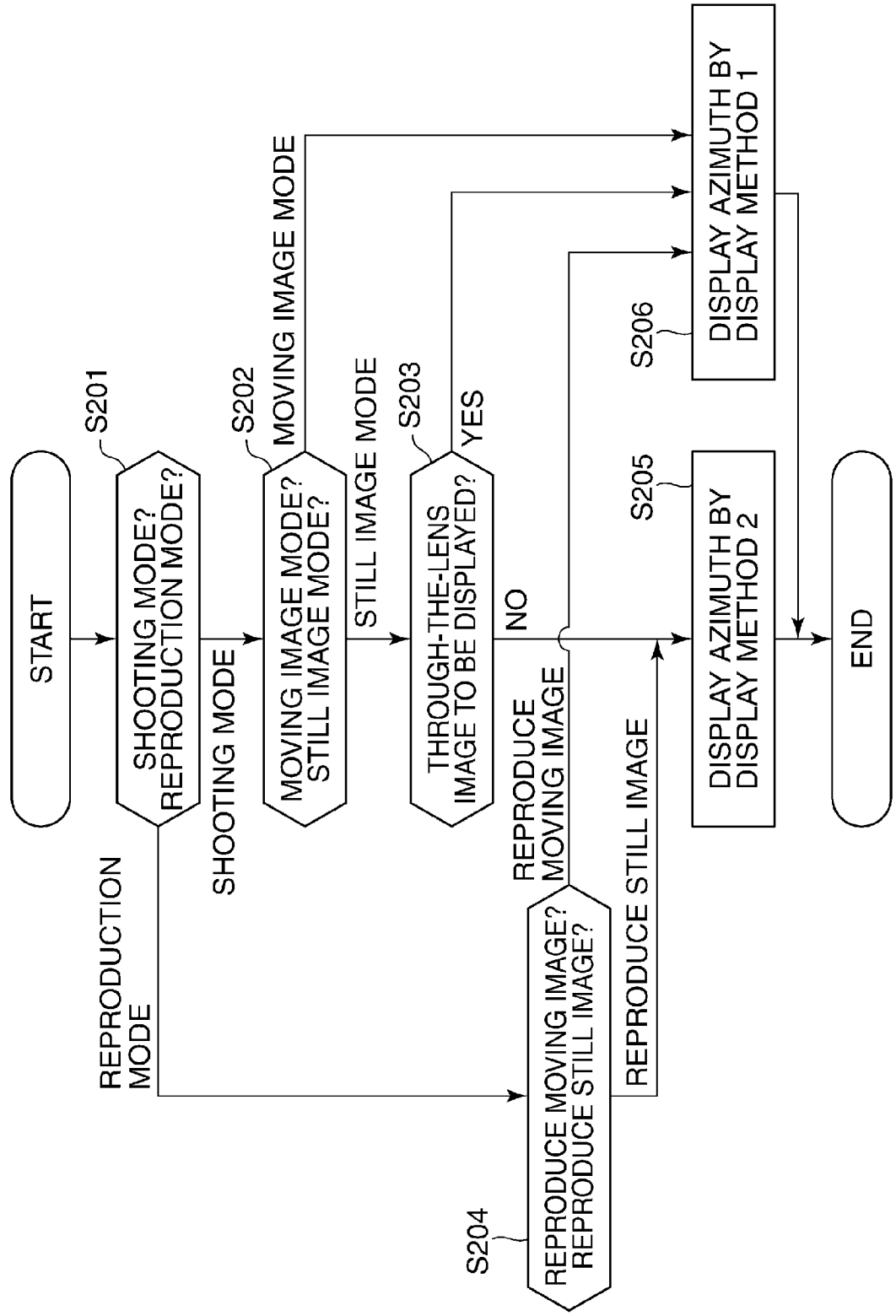

IMAGE PICKUP APPARATUS HAVING ELECTRONIC COMPASS FUNCTION, CONTROL METHOD THEREFOR, AND STORAGE MEDIUM

BACKGROUND OF THE INVENTION

1. Field of the Invention

The present invention relates to an image pickup apparatus and a control method therefor, as well as a computer-readable storage medium storing a control program for implementing the method, and in particular to a method of displaying a shooting azimuth in an image pickup apparatus having an electronic compass function.

2. Description of the Related Art

In recent years, there has been a growing need in a digital camera for knowing a shooting position and a shooting direction, and those which have a GPS system and an electronic compass function incorporated therein or those which work in cooperation with external GPS equipment have come onto the market.

A main use of an electronic compass in a digital camera is to detect an azimuth of a central part of a taken image (in the direction of the center of a lens' optical axis) and record the azimuth as shooting azimuth data in association with taken image data. On the other hand, an electronic compass function of a digital camera can assist shooting by displaying a shooting azimuth in real time on a display and an EVF on a rear side of the digital camera during shooting.

There has also been proposed a method that, when displaying a shooting azimuth, expressing the shooting azimuth using a figure or a scale because the shooting azimuth displayed merely in numerical form is not easy to understand. For example, Japanese Laid-Open Patent Publication (Kokai) No. H11-155124 discloses a technique according to which environmental conditions during shooting such as position, azimuth, and temperature are defined as graphics and displayed in combination with a taken image. Also, Japanese Laid-Open Patent Publication (Kokai) No. 2008-17223 discloses a technique according to which a guide image indicative of a placement of a subject is created from information on an installation location of an apparatus, information on a pose of the apparatus, and time information, and the created guide image is displayed in a manner being superimposed on a live view image. For example, when the night sky is to be shot, an image of a constellation is displayed as a guide image, enabling a user to shoot a desired constellation.

Expressing a shooting azimuth using a figure or a scale or creating and displaying a guide image as described above enables a user to visually recognize a shooting azimuth and use the same for framing during shooting. Further, using positional information, pose information, time information, information on an angle of view, and so on in combination makes it possible to estimate the position and size of a subject itself, which can be used as very useful assist information during shooting.

However, in the case of displaying a though-the-lens image from an image pickup device in real time on a display or an EVF mounted on a rear side of a digital camera for the purpose of framing during shooting, it is necessary to update a though-the-lens image at a frame rate of 15 to 30 frames per second. At the same time, in the case of displaying an azimuth using a figure and a scale, the amount of computations per unit time is large, and hence it is difficult for an arithmetic device with low processing power such as one mounted on a digital camera to produce complicated displays.

Moreover, because the angle of view in shooting does not change when a taking lens is a single focus lens, the interval between ticks does not have to be variable. On the other hand, the angle of view in shooting changes when a taking lens is a zoom lens, the interval between ticks has to be adjusted in real time according to zoom position so that a view of a through-the-lens image being displayed and a view of a shooting azimuth around a perimeter of a screen can be coincident with each other. Such real-time operations require an enormous amount of computations, and it would be much more difficult for an arithmetic device with low processing power to realize this. Even if this can be realized, other processes important for shooting such as a process in which a face is detected, a process in which a subject is followed, and a process in which autofocus is continuously performed (continuous AF) may be affected. The same holds for not only displaying of a through-the-lens image during taking of a still image but also displaying of a through-the-lens image during taking of a moving image.

SUMMARY OF THE INVENTION

The present invention provides an image pickup apparatus and a control method therefor, which are capable of displaying a shooting azimuth for a user such that it can be intuitively understood with ease while keeping the amount of computations required to display a shooting azimuth small, as well as a computer-readable storage medium storing a program for implementing the method.

Accordingly, a first aspect of the present invention provides an image pickup apparatus comprising an image pickup unit configured to shoot a subject, an obtaining unit configured to obtain shooting azimuth information, a display unit configured to display an image, and a display control unit configured to, when a though-the-lens image or a moving image from the image pickup unit is displayed on the display unit, display the shooting azimuth by a first azimuth display method based on the shooting azimuth information obtained by the obtaining unit, and when a though-the-lens image or a moving image from the image pickup unit is not displayed on the display unit, display the shooting azimuth by a second azimuth display method, which is different from the first azimuth display method, based on the shooting azimuth information obtained by the obtaining unit.

Accordingly, a second aspect of the present invention provides an image pickup apparatus comprising an image pickup unit configured to shoot a subject, an obtaining unit configured to obtain shooting azimuth information, a display unit configured to display an image, a switching unit configured to switch between a shooting mode and a reproduction mode, and a display control unit configured to, based on the shooting azimuth information obtained by the obtaining unit, cause the display unit to display the shooting azimuth, wherein when the shooting mode is set, the display control unit causes the display unit to display the shooting azimuth by a first azimuth display method together with a through-the-lens image from the image pickup unit, and when the reproduction mode is set, the display control unit causes the display unit to display the shooting azimuth by a second azimuth display method different from the first azimuth display method.

Accordingly, a third aspect of the present invention provides an image pickup apparatus comprising an image pickup unit configured to shoot a subject, an obtaining unit configured to obtain shooting azimuth information, a display unit configured to display an image, and a display control unit configured to, based on the shooting azimuth information obtained by the obtaining unit, causes the display unit to display the shooting azimuth, wherein to display a moving image on the display unit, the display control unit causes the display unit to display the shooting azimuth by a first azimuth display method, and to display a still image on the display unit, the display control unit causes the display unit to display the shooting azimuth by a second azimuth display method different from the first azimuth display method.

Accordingly, the fourth aspect of the present invention provides a control method for an image pickup apparatus comprising an image pickup unit that shoots a subject, an obtaining unit that obtains shooting azimuth information, a display unit, and a display control unit, comprising a display control step in which, when a though-the-lens image or a moving image from the image pickup unit is displayed on the display unit, the display control unit displays the shooting azimuth by a first azimuth display method based on the shooting azimuth information obtained by the obtaining unit, and when a though-the-lens image or a moving image from the image pickup unit is not displayed on the display unit, the display control unit displays the shooting azimuth by a second azimuth display method, which is different from the first azimuth display method, based on the shooting azimuth information obtained by the obtaining unit.

Accordingly, the fifth aspect of the present invention provides a control method for an image pickup apparatus comprising an image pickup unit that shoots a subject, an obtaining unit that obtains shooting azimuth information, and a display unit that displays an image, comprising a switching step of switching between a shooting mode and a reproduction mode, and a display control step of, based on the shooting azimuth information obtained by the obtaining unit, causing the display unit to display the shooting azimuth, wherein in the display control step, when the shooting mode is set, the display unit is caused to display the shooting azimuth by a first azimuth display method together with a through-the-lens image from the image pickup unit, and when the reproduction mode is set, the display unit is caused to display the shooting azimuth by a second azimuth display method different from the first azimuth display method.

Accordingly, the sixth aspect of the present invention provides a control method for an image pickup apparatus comprising an image pickup unit that shoots a subject, an obtaining unit that obtains shooting azimuth information, and a display unit that displays an image, comprising a display control step of, based on the shooting azimuth information obtained by the obtaining unit, causing the display unit to display the shooting azimuth, wherein in the display control step, to display a moving image on the display unit, the display unit is caused to display the shooting azimuth by a first azimuth display method, and to display a still image on the display unit, the display unit is caused to display the shooting azimuth by a second azimuth display method different from the first azimuth display method.

Accordingly, the seventh aspect of the present invention provides a non-transitory computer-readable storage medium storing a program for implementing a control method for an image pickup apparatus comprising an image pickup unit that shoots a subject, an obtaining unit that obtains shooting azimuth information, a display unit, and a display control unit, the method comprising a display control step in which, when a though-the-lens image or a moving image from the image pickup unit is displayed on the display unit, the display control unit displays the shooting azimuth by a first azimuth display method based on the shooting azimuth information obtained by the obtaining unit, and when a though-the-lens image or a moving image from the image pickup unit is not displayed on the display unit, the display control unit displays the shooting azimuth by a second azimuth display method, which is different from the first azimuth display method, based on the shooting azimuth information obtained by the obtaining unit.

Accordingly, the eighth aspect of the present invention provides a non-transitory computer-readable storage medium storing a program for implementing a control method for an image pickup apparatus comprising an image pickup unit that shoots a subject, an obtaining unit that obtains shooting azimuth information, and a display unit that displays an image, comprising a switching step of switching between a shooting mode and a reproduction mode, and a display control step of, based on the shooting azimuth information obtained by the obtaining unit, causing the display unit to display the shooting azimuth, wherein in the display control step, when the shooting mode is set, the display unit is caused to display the shooting azimuth by a first azimuth display method together with a through-the-lens image from the image pickup unit, and when the reproduction mode is set, the display unit is caused to display the shooting azimuth by a second azimuth display method different from the first azimuth display method.

Accordingly, the ninth aspect of the present invention provides a non-transitory computer-readable storage medium storing a program for implementing a control method for an image pickup apparatus comprising an image pickup unit that shoots a subject, an obtaining unit that obtains shooting azimuth information, and a display unit that displays an image, comprising a display control step of, based on the shooting azimuth information obtained by the obtaining unit, causing the display unit to display the shooting azimuth, wherein in the display control step, to display a moving image on the display unit, the display unit is caused to display the shooting azimuth by a first azimuth display method, and to display a still image on the display unit, the display unit is caused to display the shooting azimuth by a second azimuth display method different from the first azimuth display method.

According to the present invention, because a shooting azimuth can be displayed for a user such that it can be intuitively understood with ease while the amount of computations required to display a shooting azimuth is kept small.

Further features of the present invention will become apparent from the following description of exemplary embodiments (with reference to the attached drawings).

BRIEF DESCRIPTION OF THE DRAWINGS

FIG. 2 is a flowchart of a process in which shooting azimuth displays are switched in the digital camera.

DESCRIPTION OF THE EMBODIMENTS

Embodiments of the present invention will now be described in detail with reference to the drawings.

Figure 1A:
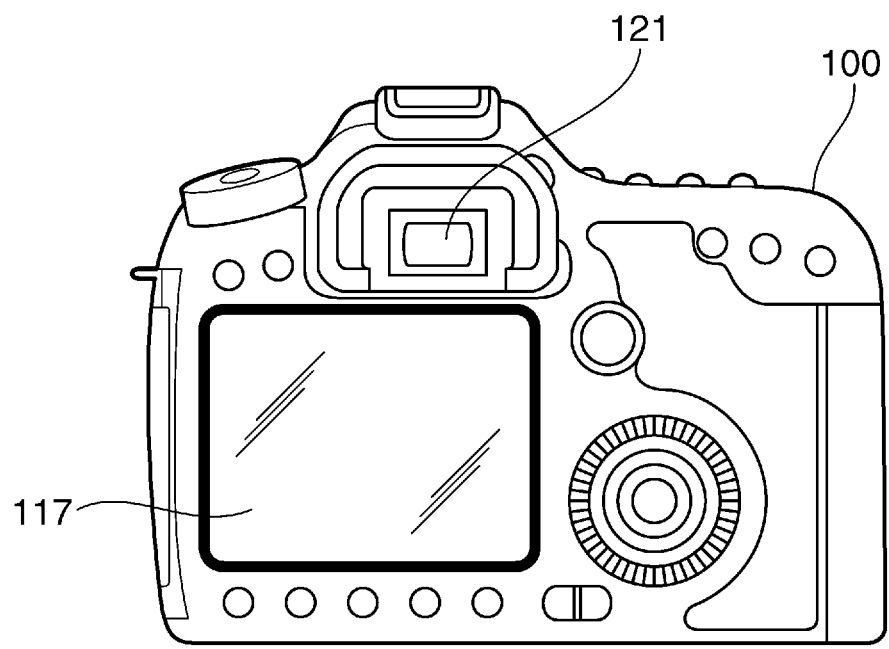
FIG. 1A is a rear view showing a digital camera which is an exemplary image pickup apparatus according to an embodiment of the present invention.

FIG. 1A is a rear view showing a digital camera which is an exemplary image pickup apparatus according to an embodiment of the present invention.

The digital camera 100 is an image pickup apparatus having an electronic compass function. A TFT display 117 and an EVF 121 are provided on a rear side of the camera, and an interchangeable taking lens (not shown) is mounted on a front side of the camera.

The TFT display 117 is disposed such that a shooting direction coincides with a direction of the depth of the TFT display 117. Because of this layout, when a through-the-lens image taken by an image pickup device in the digital camera 100 is displayed on the TFT display 117, it looks as if a subject were peeped through the rear side of the camera.

Figure 1B:
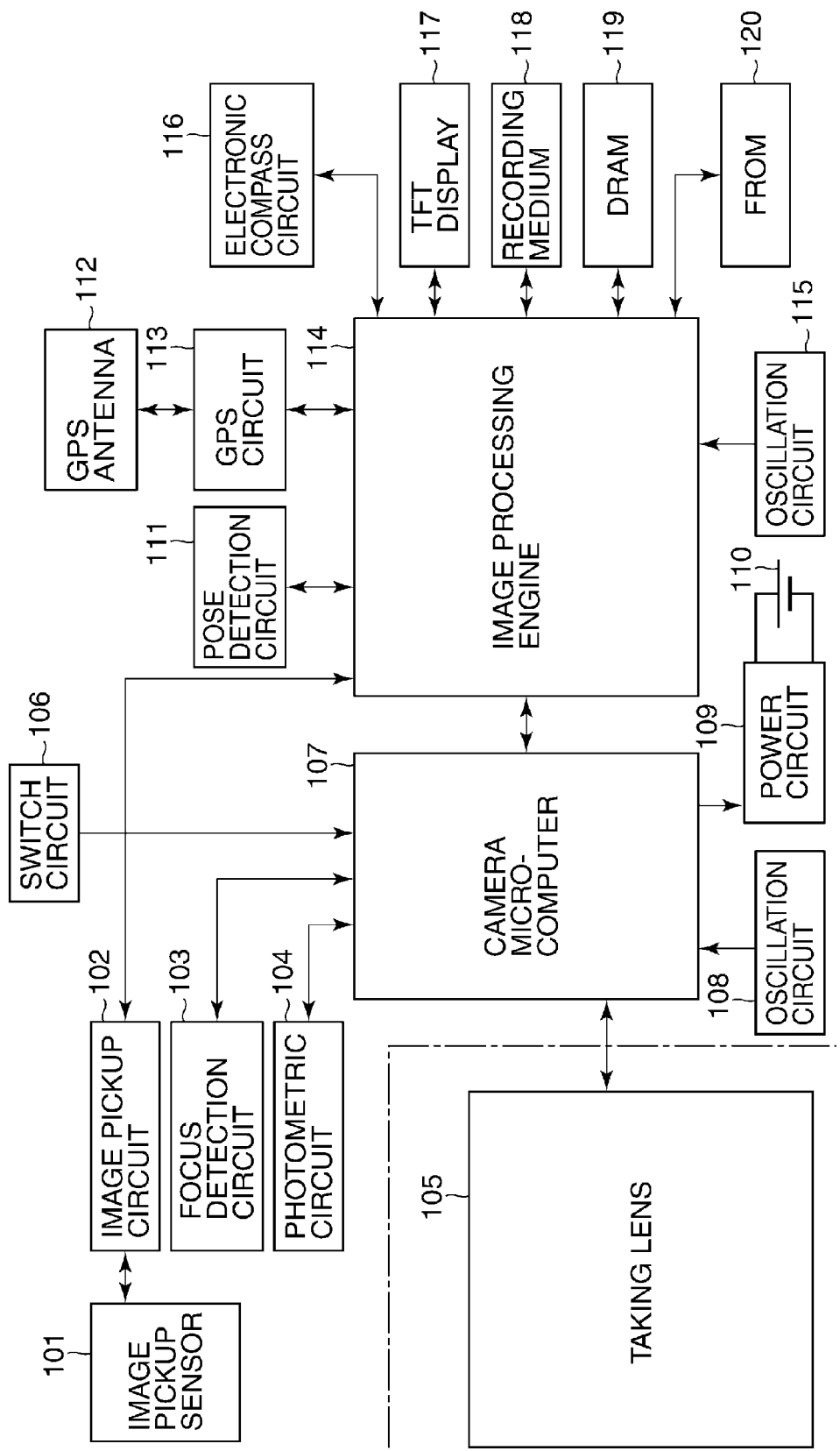
FIG. 1B is a block diagram schematically showing a functional arrangement of the digital camera appearing in FIG. 1A.

FIG. 1B is a block diagram schematically showing a functional arrangement of the digital camera 100 appearing in FIG. 1A.

The digital camera 100 has an image pickup sensor (image pickup device) 101, an image pickup circuit 102, a focus detection circuit 103, a photometric circuit 104, a taking glens 105, a switch circuit 106, a camera microcomputer 107, an oscillation circuit 108, a power circuit 109, and a power source 110. The digital camera 100 also has a pose detection circuit 111, a GPS antenna 112, a GPS circuit 113, an image processing engine 114, an oscillation circuit 115, an electronic compass circuit 116, the TFT display 117, a recording medium 118, a DRAM 119, and an FROM 120.

The switch circuit 106 including switches and dials provided in the digital camera 100 enables a user to selectively disable and enable the displaying of a through-the-lens image, switch between a shooting mode and a reproduction mode, and switch between a moving image mode and a still image mode. The image processing engine 114 not only performs image processing on image data taken by the image pickup sensor 101, but also determines a camera pose by performing computations on data from the pose detection circuit 111. The image processing engine 114 also calculates a shooting direction by performing computations on data from the electronic compass circuit 116 and data from the pose detection circuit 111, and processes positional data detected using the GPS antenna 112 and the GPS circuit 113. Further, the image processing engine 114 displays, on the TFT display 117, a through-the-lens image from the image pickup sensor 101, still image data and moving image data stored in the recording medium 118 after shooting, as well as a computed shooting direction.

The camera microcomputer 107 controls the taking lens 105 based on data from the focus detection circuit 103 and the photometric circuit 104, and receives zoom position information and focal distance information from the taking lens 105 and passes them to the image processing engine 114.

FIG. 2 is a flowchart of a process in which shooting azimuth displays are switched in the digital camera 100. This process is carried out by the image processing engine 114 which is a display control unit.

First, in step S201, the image processing engine 114 determines whether a shooting mode is set or a reproduction mode is set in the digital camera 100. The image processing engine 114 determines a set mode according to, for example, a state of a shooting mode/reproduction mode selector switch or the like in the switch circuit 106. With respect to operation modes and the like described below, determinations are made in the same way. Upon determining in the step S201 that the shooting mode is set, the image processing engine 114 determines whether a moving image taking mode is set or a still image taking mode is set among a plurality of operation modes included in the shooting mode (step S201). Upon determining that the moving image taking mode is set, the image processing engine 114 displays a shooting direction by a display method 1, to be described later (step S206). In the present embodiment, in the moving image taking mode, light from a subject is caused to fall upon the image pickup sensor 101 by mirror lock-up. In both a moving image recording standby state and a moving image recording state, a subject image taken by the image pickup sensor 101 is displayed as a through-the-lens image on the TFT display 117 in substantially real time.

Upon determining in the step S202 that the still image taking mode is set, the image processing engine 114 determines whether or not though-the-lens image display is set (step S203). A case where a though-the-lens image is to be displayed during taking of a still image means a case where live view (LV) is ON in the digital camera 100. LV is selectively turned on and off by the user depressing an LV button (not shown). When LV is switched from OFF to ON, light from a subject is caused to fall upon the image pickup sensor 101 by mirror lock-up. Then, a subject image taken by the image pickup sensor 101 is displayed as a through-the-lens image on the TFT display 117 in substantially real time. When LV is switched from ON to OFF, light from a subject is guided to an optical viewfinder with a mirror put down. Thus, the user can perform shooting while observing optical images through a peep-type eyepiece finder. Upon determining that though-the-lens image display is set, the image processing engine 114 proceeds to the step S206, in which it displays a shooting azimuth by the display method 1. On the other hand, upon determining that though-the-lens image display is not set, the image processing engine 114 proceeds to step S205, in which it displays a shooting azimuth by a display method 2, to be described later.

Upon determining in the step S201 that the reproduction mode is set, the image processing engine 114 proceeds to step S204, in which it determines whether moving image reproduction is set or still image reproduction is set. Upon determining that moving image reproduction is set, the image processing engine 114 proceeds to the step S206, in which it displays azimuth information obtained during taking of a moving image by the display method 1. On the other hand, upon determining that still image reproduction is set, the image processing engine 114 proceeds to the step S205, in which it displays azimuth information obtained during taking of a still image by the display method 2.

Figure 3:
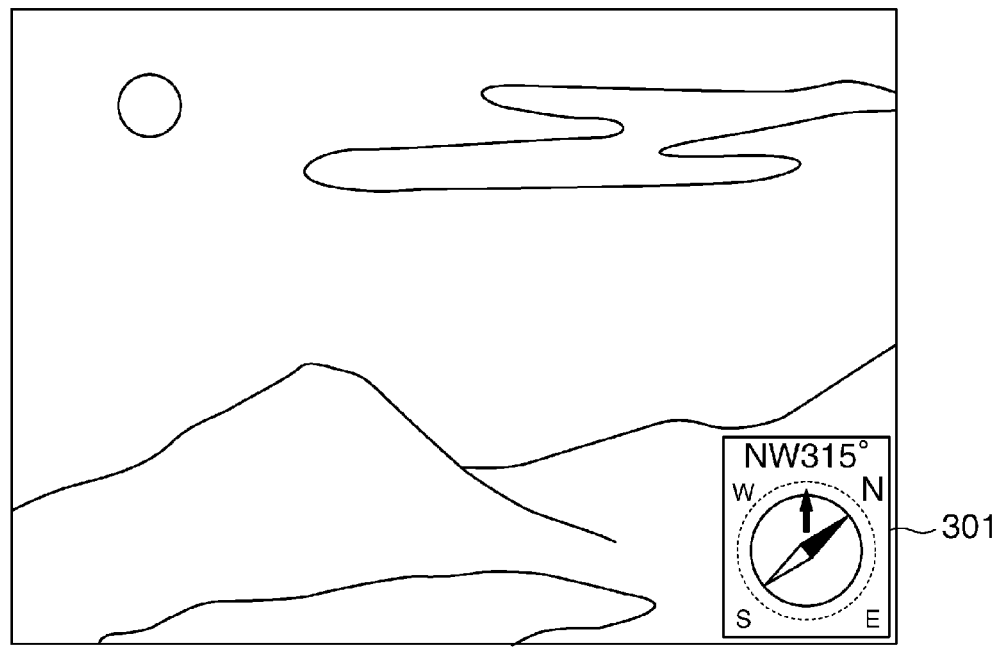
FIG. 3 is a view showing exemplary azimuth information displayed on a TFT display in step S206 in FIG. 2 by a display method 1.

Referring next to FIG. 3, a description will be given of the display method 1 according to the present embodiment.

FIG. 3 is a view showing an exemplary azimuth information displayed on the TFT display 117 by the display method 1 in the step S206 appearing in FIG. 2.

The display method 1 is to display shooting azimuth information together with a though-the-lens image from the image pickup sensor 101. Azimuth information is displayed by the display method 1 when a moving image is taken and when a moving image is reproduced.

At the time of reproducing a though-the-lens image from the image pickup sensor 101, at the time of taking a moving image, and at the time of reproducing a moving image, it is necessary to display more than 15 to 30 frames per second in real time. Accordingly, a processor (not shown) provided in the image processing engine 114 consumes an enormous amount of computation resources.

The image processing engine 114 has only a small amount of resources that can be allowed for processing other than image processing. Specifically, when trying to display information for assisting shooting such as photometric information, positional information from a GPS, or information indicative of a lens state for the user via the TFT display 117, it is only possible to display such information by a simple display method that can be realized by simple computations. The same holds for information concerning electronic compassing. When shooting azimuth information concerning electronic compassing is to be displayed, it is difficult to intuitively understand such information when an azimuth angle using only numeric is displayed. For this reason, it is necessary to graphically display such information using a figure and a scale, and as compared to displaying of lens information, photometric information, and so on, a larger amount of computation resources are consumed. In the digital camera 100, because it is necessary to, at the time of shooting, obtain information from the electronic compass circuit 116 in real time and display shooting azimuth information in real time, a heavy burden is placed on the image processing engine 114.

In the display example shown in FIG. 3, shooting azimuth information 301 is displayed at a lower right corner of a screen. The shooting azimuth information shown in the figure is displayed such that a circular azimuth scale that resembles a compass is displayed in a state of being fixed, and a figure that resembles a needle of a compass is rotated according to information from the electronic compass circuit 116. This display form requires only a small amount of computations because the display size is small, the size of parts moved in real time and patterns in which they are moved are limited, and no processing that performs complex computations using other information such as lens information is required. Thus, even in a situation where the image processing engine 114 is heavily loaded so as to display a though-the-lens image or a moving image, real time processing is adequately possible. It should be noted that this display method requires the user to read a direction in which the needle of the compass points and understand that the direction is a shooting direction (a direction of an optical axis, that is, a direction of a central part of a through-the-lens image being displayed). This display method may be less intuitive than the display method 2, to be described later, because a direction in which the needle of the compass points does not directly correspond to the center of a through-the-lens image, and the user is forced to understand the above.

Referring next to FIGS. 4A, 4B, 4C, 5A, and 5B, a description will be given of the display method 2 according to the present embodiment.

Figure 4A:
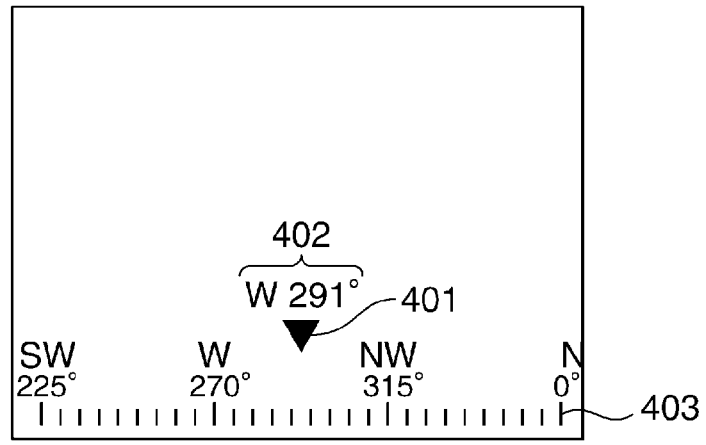
FIG. 4A is a view showing a display example in which only a shooting direction is displayed.

FIG. 4A is a view showing a display example in which only a shooting azimuth is displayed.

When only a shooting azimuth is to be displayed, a triangular mark 401 indicating an azimuth of a central part of a taken image and a numeric 402 indicating a shooting azimuth angle are displayed, and at the same time, an azimuth scale 403 is displayed on a straight line in a lateral direction of a screen with neither a though-the-lens image nor a moving image being displayed in real time. As a result, azimuths of edge portions of a taken image can be known. This display is realized by the image processing engine 114 computing a shooting angle of view based on focal length information from the taking lens 105 and size information from the image pickup sensor 101 and determining the interval between ticks of the azimuth scale 403.

Figure 4B:
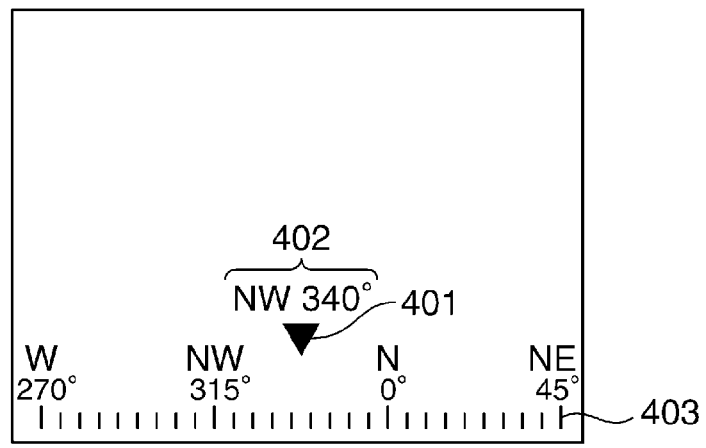
FIG. 4B is a view showing a display example of a shooting azimuth in a case where shooting azimuth has changed.

FIG. 4B is a view showing a display example of a shooting azimuth when shooting azimuth has changed.

A description will now be given of a case where the shooting azimuth shown in FIG. 4A has changed to the shooting azimuth shown in FIG. 4B. When shooting azimuth has changed, the image processing engine 114 obtains information from the electronic compass circuit 116 in real time, and in response to this, the azimuth scale 403 displayed across the lateral side of the screen move horizontally, and the numeric 402 indicative of a shooting azimuth angle in the center of the screen also changes. According to the display method 2, the position of the triangular mark 401 lies in the center of the screen which corresponds to a shooting direction, and the azimuth scale 403 indicative of an azimuth of the shooting direction is displayed just below the triangular mark 401. Thus, it is possible to intuitively understand that the azimuth of the shooting direction (the direction of the lens optical axis, that is, the direction in which the taking lens is pointing) is an azimuth of the azimuth scale 403 indicated by the triangular mark 401. To put it the other way around, it is possible to intuitively understand that the azimuth of the azimuth scale 403 indicated by the triangular mark 401 is an azimuth of the direction in which the taking lens 105 is pointing. The result is that the azimuth of the shooting direction can be more intuitively understood as compared to the display method 1.

Figure 4C:
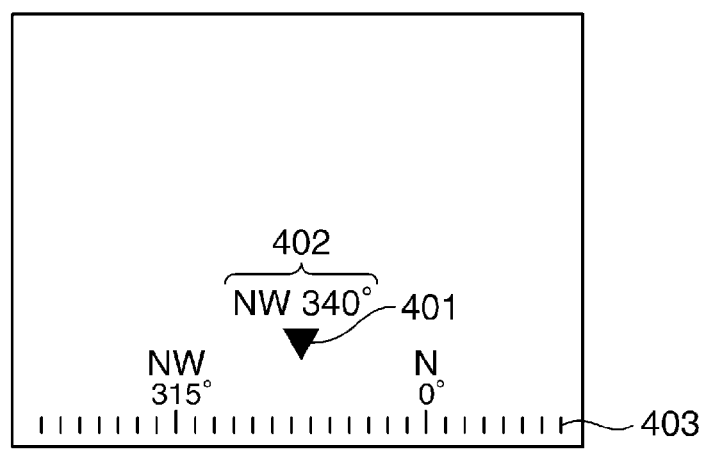
FIG. 4C is a view showing a display example of a shooting azimuth in a case where zooming position has changed with respect to FIG. 4B.

FIG. 4C is a view showing a display example of a shooting azimuth in a case where zoom position has changed with respect to FIG. 4B.

When the zoom position of the taking lens 105 has changed in response to a user's operation, the camera microcomputer 107 obtains information indicative of this in real time and sends the information to the image processing engine 114. In the image processing engine 114, the shooting angle of view is recalculated in real time based on the zoom position information. Then, based on the calculation result, the interval between ticks of the azimuth scale 403 and the range of azimuth indicated by the azimuth ticks are determined. Further, this information is displayed in real time, so that the range of azimuth indicated by ticks of the azimuth scale 403 expand and contract as the user changes zoom position. Namely, as zoom position comes to the telephoto side, the angle of view decreases, and hence the range of azimuth indicated by the azimuth scale 403 from the left end to the right end of the screen becomes narrower. On the other hand, as the zoom position comes to the wide-angle side, the angle of view becomes wider, and hence the range of the azimuth scale 403 from the left end to the right end of the screen becomes wider.

It should be noted that an object is to display information on a shooting azimuth, and hence it is unnecessary to display angles in the rear of the digital camera, and basically, the maximum range of the azimuth scale 403 is not more than an angle of view at a wide-angle end, that is, not more than 180 degrees.

In the present embodiment, because the number of ticks of the azimuth scale 403 for the same range of azimuth is the same, the interval between ticks of the azimuth scale 403 to be displayed changes as zoom position changes. Changing the visual interval between ticks of the azimuth scale 403 more reliably enables the user to recognize that the range of azimuth indicated by the azimuth scale 403 has changed in response to a change in zoom position.

Figure 5A:
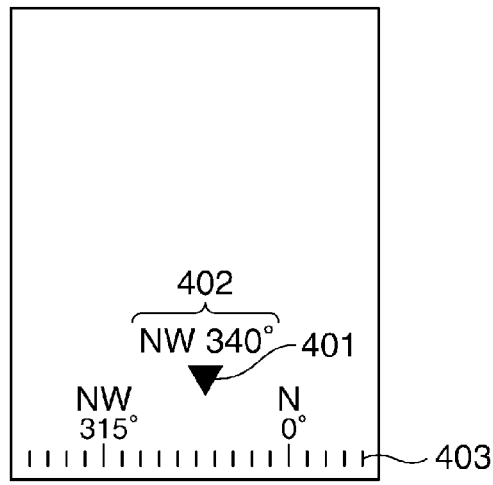
FIG. 5A is a view showing a display example of a shooting azimuth in a case where the pose of the digital camera has changed.

FIG. 5A is a view showing a display example of a shooting azimuth in a case where the pose of the digital camera 100 has changed.

The image processing engine 114 receives pose information from the pose detection circuit 111 in real time and determines whether the digital camera 100 is a landscape orientation or a portrait orientation. Based on the determination result, the image processing engine 114 selectively determines whether to display the azimuth scale 403 in the lateral direction of the screen or the longitudinal direction of the screen. At this time, the length of the screen and the angle of view differ between the lateral direction of the screen and the longitudinal direction of the screen due to a difference in aspect ratio. Thus, when the pose of the digital camera 100 changes from a portrait orientation to a landscape orientation or from a landscape orientation to a portrait orientation, the image processing engine 114 appropriately adjusts the range of azimuth indicated by the azimuth scale 403 according to the position at which the azimuth scale 403 is displayed.

Figure 5B:
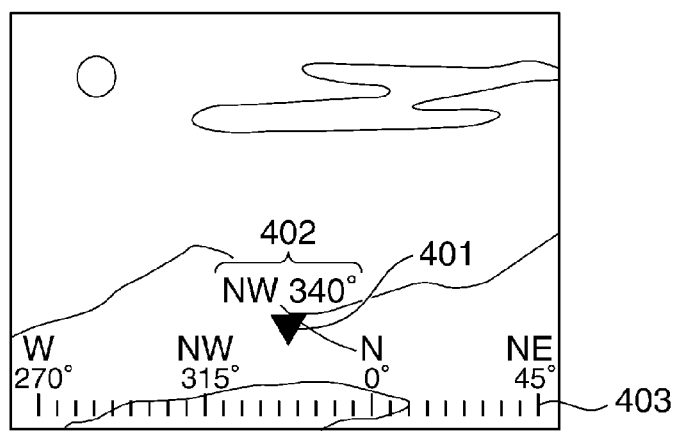
FIG. 5B is a view showing a display example of a shooting azimuth in a case where a still image is reproduced and displayed.

FIG. 5B is a view showing a display example of a shooting azimuth in a case where a still image is reproduced and displayed.

When reproducing and displaying a still image, it is unnecessary to update images in real time, and hence a numeric representing an azimuth angle and an azimuth scale are displayed in a manner being superimposed on a fixed image. In this case, the image processing engine 114 obtains information from the electronic compass circuit 116 in real time and displays an azimuth based on shooting azimuth information obtained during shooting and stored in association with a taken image, not based on computed azimuth data. It should be noted that to enlarge a display of an azimuth, the interval between ticks of the azimuth scale and the range of the azimuth scale are computed again according to the size of an enlarged display area. Namely, by computing an azimuth with respect to a range of an image being displayed as a result of enlargement, the interval between ticks of the azimuth scale and the range of the azimuth scale are determined.

According to the present embodiment, it is determined whether a through-the-lens image is to be displayed or a moving image is to be displayed, and according to the determination result, the shooting azimuth display methods is changed. Because displaying of a through-the-lens image or a moving image puts a heavy arithmetic processing load, a shooting azimuth is displayed using simple display items so that the shooting azimuth can be intuitively understood with ease while the amount of computations required to display the shooting azimuth is kept small, and in other cases, a shooting azimuth is displayed in a detailed manner. Because display items are varied according to whether a through-the-lens image or a moving image is displayed, a shooting azimuth can be displayed according to computation resources. Moreover, according to the present embodiment, display is controlled such that whether to a display through-the-lens image or display a moving image is determined, and the display method is selected according to the determination result. However, display may be controlled such that when an enormous amount of computations are required, a shooting azimuth is displayed by the display method 1, and in other cases, a shooting azimuth is displayed by the display method 2. For example, in an image pickup apparatus capable of switching between a shooting mode and a reproduction mode using a switching operation unit, when the shooting mode is set, a shooting azimuth may be displayed by the display method 1 because image processing for displaying a through-the-lens image and shooting and recording is performed, and on the other hand, when the reproduction mode is set, a shooting azimuth may be displayed by the display method 2 because the amount of computations is smaller than in the shooting mode. Moreover, when taking a still image or a moving image (when recording an image taken by an image pickup sensor in response to a shooting instruction), a larger amount of computations are required because not only image processing but also format conversion and compression processing for the purpose of recording are performed. For this reason, a shooting azimuth may be displayed in a simpler way than the display method 1, or a shooting azimuth may not be displayed on a temporary basis during shooting.

An image pickup apparatus according to a second embodiment of the present invention differs from the first embodiment described above in the display method 2. Other elements of the present embodiment are the same as the corresponding ones of the first embodiment described above, and therefore, description thereof is omitted.

Figure 6:
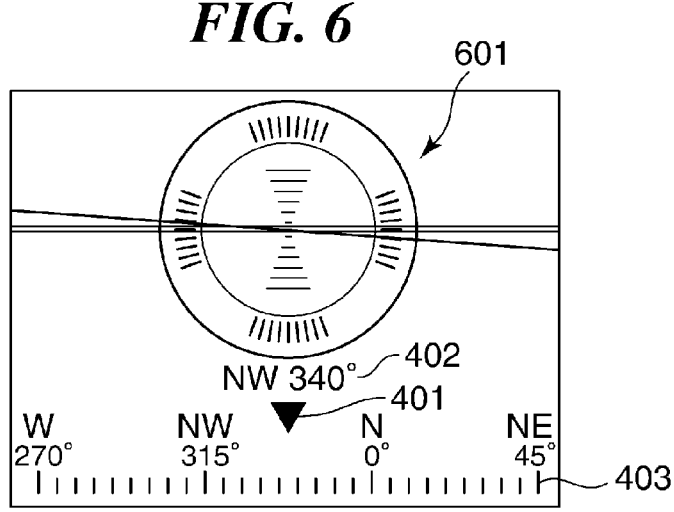
FIG. 6 is a view showing an exemplary display produced by a shooting azimuth display method according to a second embodiment.

FIG. 6 is a view showing an example of a display produced by a shooting azimuth display method according to the second embodiment. In the example shown in the figure, a level display 601 as well as a shooting azimuth display is produced.

The level display 601 detects a tilt of the digital camera with high accuracy and displays the tilt on the TFT display 117. Determination of a composition is assisted during shooting so as to prevent a taken image from being diagonal to the ground.

FIGS. 4A to 5B show the display method in the case where the angles of the two axes in the pitch direction and the roll direction are displayed for the user as information on the pose of the digital camera 100 with respect to the ground. Referring to FIG. 6, in addition to this, an electronic compass as well is graphically displayed using the azimuth scale 403 and an indicator mark in the center of the screen. This can provide information on not only the pitch direction and the roll direction but also the yaw direction in an easy-to-understand way as information on the pose of the digital camera 100 with respect to the ground. Therefore, when determining a shooting composition, the user can obtain easy-to-understand information which is very helpful.

The image processing engine 114 complexly computes information from the multiaxial and high-precision pose detection circuit 111, the electronic compass circuit 116, and the taking lens 105, define the computation results as graphics which are easy to understand, and displays the screen shown in the figure on the TFT display 117.

According to the present embodiment, whether to display a though-the-lens image or display a moving image, and according to the determination result, the shooting azimuth display method is selected. As a result, even in the case of a shooting azimuth display which requires an enormous amount of computations, a shooting azimuth can be displayed such that it can be intuitively understood with ease while the overall amount of computations required for the image processing engine 114 is kept small.

It should be noted that control by the image processing engine 114 may be exercised by a piece of hardware, or the entire apparatus may be controlled by multiple pieces of hardware which shares processing.

Moreover, although in the embodiments described above, the present invention is applied to a single-lens reflex digital camera, this is not limitative, but the present invention may be applied to any devices such as a digital video camera and a compact digital camera as long as they have an image pickup unit. Further, the present invention may be applied to a PC with a camera, a PDA with a camera, a cellular phone with a camera, a portable image viewer with a camera, a digital photo frame with a camera, a music player with a camera, a game machine with a camera, an electronic book reader with a camera, and so on.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-209003 filed Sep. 26, 2011, which is hereby incorporated by reference herein in its entirety.

What is claimed is:

1. An image pickup apparatus comprising:
an image pickup unit configured to shoot a subject;
an obtaining unit configured to obtain shooting azimuth information;
a display unit configured to display an image; and
a display control unit configured to, when a live view image from said image pickup unit or a moving image is displayed on said display unit, display the shooting azimuth by a first azimuth display method based on the shooting azimuth information obtained by said obtaining unit, and when a live view image from said image pickup unit or a moving image is not displayed on said display unit, display the shooting azimuth by a second azimuth display method, which is different from the first azimuth display method, based on the shooting azimuth information obtained by said obtaining unit,
wherein the first azimuth display method uses less processor computations than the second azimuth display method,
wherein the second azimuth display method is a method that changes an interval between ticks of a scale indicative of the azimuth according to an angle of view in shooting by said image pickup unit.

2. An image pickup apparatus according to claim 1, wherein in the second azimuth display method, said display control unit displays display items different from display items in the first azimuth display method.

3. An image pickup apparatus according to claim 1, wherein the shooting azimuth is a magnetic azimuth in which the image pickup apparatus is pointing.

4. An image pickup apparatus according to claim 1, wherein
the first azimuth display method is a method that displays azimuth information indicative of a direction of an optical axis of the image pickup unit together with an image taken by said image pickup unit,
wherein the second azimuth display method is a method that displays azimuth information indicative of the direction of the optical axis of the image pickup unit and the scale indicative of the azimuth on a straight line in a lateral direction of a screen of said display unit.

5. An image pickup apparatus according to claim 1, wherein the second azimuth display method is a method that changes a position at which the scale indicative of the azimuth is displayed according to a pose of the image pickup apparatus.

6. An image pickup apparatus according to claim 1, wherein when a still mage after shooting by said image pickup unit is displayed on said display unit, said display control unit displays the shooting azimuth by the second azimuth display method based on the shooting azimuth information obtained by said obtaining unit when the still image was taken, and to enlarge the still image, compute again an interval between ticks of the scale indicative of the azimuth and a range of the scale according to a size of an enlarged display area.

7. An image pickup apparatus according to claim 1, wherein a maximum range of the scale indicative of the azimuth is equal to or less than an angle of view at a wide-angle end and equal to or not more than 180 degrees.

8. An image pickup apparatus according to claim 1, wherein
the first azimuth display method is a method that displays azimuth information in the direction of the optical axis of the image pickup unit together with the image taken by said image pickup unit,
wherein the second azimuth display method is a method that displays azimuth information in the direction of the optical axis of the image pickup unit and a scale indicative of the azimuth on a straight line in a lateral direction of a screen of said display unit and also displays information indicative of a tilt of the image pickup apparatus.

9. An image pickup apparatus comprising:
an image pickup unit configured to shoot a subject;
an obtaining unit configured to obtain shooting azimuth information;
a display unit configured to display an image;
a switching unit configured to switch between a shooting mode and a reproduction mode; and
a display control unit configured to, based on the shooting azimuth information obtained by said obtaining unit, cause said display unit to display the shooting azimuth,
wherein when the shooting mode is set, said display control unit causes said display unit to display the shooting azimuth by a first azimuth display method together with a live view image from said image pickup unit or a moving image, and when the reproduction mode is set, said display control unit causes said display unit to display the shooting azimuth by a second azimuth display method different from the first azimuth display method,
wherein the first azimuth display method uses less processor computations than the second azimuth display method,
wherein the second azimuth display method is a method that changes an interval between ticks of a scale indicative of the azimuth according to an angle of view in shooting by said image pickup unit.

10. An image pickup apparatus comprising:
an image pickup unit configured to shoot a subject;
an obtaining unit configured to obtain shooting azimuth information;
a display unit configured to display an image; and
a display control unit configured to, based on the shooting azimuth information obtained by said obtaining unit, causes said display unit to display the shooting azimuth, wherein to display a moving image on said display unit, said display control unit causes said display unit to display the shooting azimuth by a first azimuth display method, and to display a still image on said display unit, said display control unit causes said display unit to display the shooting azimuth by a second azimuth display method different from the first azimuth display method, wherein the first azimuth display method uses less processor computations than the second azimuth display method, wherein the second azimuth display method is a method that changes an interval between ticks of a scale indicative of the azimuth according to an angle of view in shooting by said image pickup unit.

11. A control method for an image pickup apparatus comprising an image pickup unit that shoots a subject, an obtaining unit that obtains shooting azimuth information, a display unit, and a display control unit, comprising:

a display control step in which, when a live view image from said image pickup unit or a moving image is displayed on the display unit, the display control unit displays the shooting azimuth by a first azimuth display method based on the shooting azimuth information obtained by the obtaining unit, and when a live view image from said image pickup unit or a moving image is not displayed on the display unit, the display control unit displays the shooting azimuth by a second azimuth display method, which is different from the first azimuth display method, based on the shooting azimuth information obtained by the obtaining unit, wherein the first azimuth display method uses less processor computations than the second azimuth display method, wherein the second azimuth display method is a method that changes an interval between ticks of a scale indicative of the azimuth according to an angle of view in shooting by said image pickup unit.

12. A control method for an image pickup apparatus comprising an image pickup unit that shoots a subject, an obtaining unit that obtains shooting azimuth information, and a display unit that displays an image, comprising:

a switching step of switching between a shooting mode and a reproduction mode; and a display control step of, based on the shooting azimuth information obtained by the obtaining unit, causing the display unit to display the shooting azimuth, wherein in said display control step, when the shooting mode is set, the display unit is caused to display the shooting azimuth by a first azimuth display method together with a live view image from said image pickup unit or a moving image, and when the reproduction mode is set, the display unit is caused to display the shooting azimuth by a second azimuth display method different from the first azimuth display method, wherein the first azimuth display method uses less processor computations than the second azimuth display method, wherein the second azimuth display method is a method that changes an interval between ticks of a scale indicative of the azimuth according to an angle of view in shooting by said image pickup unit.

13. A control method for an image pickup apparatus comprising an image pickup unit that shoots a subject, an obtaining unit that obtains shooting azimuth information, and a display unit that displays an image, comprising:

a display control step of, based on the shooting azimuth information obtained by the obtaining unit, causing the display unit to display the shooting azimuth, wherein in said display control step, to display a moving image on the display unit, the display unit is caused to display the shooting azimuth by a first azimuth display method, and to display a still image on the display unit, the display unit is caused to display the shooting azimuth by a second azimuth display method different from the first azimuth display method, wherein the first azimuth display method uses less processor computations than the second azimuth display method, wherein the second azimuth display method is a method that changes an interval between ticks of a scale indicative of the azimuth according to an angle of view in shooting by said image pickup unit.

14. A non-transitory computer-readable storage medium storing a program for implementing a control method for an image pickup apparatus comprising an image pickup unit that shoots a subject, an obtaining unit that obtains shooting azimuth information, a display unit, and a display control unit, the method comprising:

a display control step in which, when a live view image from said image pickup unit or a moving image is displayed on the display unit, the display control unit displays the shooting azimuth by a first azimuth display method based on the shooting azimuth information obtained by the obtaining unit, and when a live view image from said image pickup unit or a moving image is not displayed on the display unit, the display control unit displays the shooting azimuth by a second azimuth display method, which is different from the first azimuth display method, based on the shooting azimuth information obtained by the obtaining unit, wherein the first azimuth display method uses less processor computations than the second azimuth display method, wherein the second azimuth display method is a method that changes an interval between ticks of a scale indicative of the azimuth according to an angle of view in shooting by said image pickup unit.

15. A non-transitory computer-readable storage medium storing a program for implementing a control method for an image pickup apparatus comprising an image pickup unit that shoots a subject, an obtaining unit that obtains shooting azimuth information, and a display unit that displays an image, comprising:

a switching step of switching between a shooting mode and a reproduction mode; and a display control step of, based on the shooting azimuth information obtained by the obtaining unit, causing the display unit to display the shooting azimuth, wherein in the display control step, when the shooting mode is set, the display unit is caused to display the shooting azimuth by a first azimuth display method together with a live view image from said image pickup unit or a moving image, and when the reproduction mode is set, the display unit is caused to display the shooting azimuth by a second azimuth display method different from the first azimuth display method, wherein the first azimuth display method uses less processor computations than the second azimuth display method, wherein the second azimuth display method is a method that changes an interval between ticks of a scale indicative of the azimuth according to an angle of view in shooting by said image pickup unit.

16. A non-transitory computer-readable storage medium storing a program for implementing a control method for an image pickup apparatus comprising an image pickup unit that shoots a subject, an obtaining unit that obtains shooting azimuth information, and a display unit that displays an image, comprising:

a display control step of, based on the shooting azimuth information obtained by the obtaining unit, causing the display unit to display the shooting azimuth, wherein in the display control step, to display a moving image on the display unit, the display unit is caused to display the shooting azimuth by a first azimuth display method, and to display a still image on the display unit, the display unit is caused to display the shooting azimuth by a second azimuth display method different from the first azimuth display method, wherein the first azimuth display method uses less processor computations than the second azimuth display method, wherein the second azimuth display method is a method that changes an interval between ticks of a scale indicative of the azimuth according to an angle of view in shooting by said image pickup unit.

* * * * *